United States Patent
Bulut et al.

(10) Patent No.: US 9,609,724 B2
(45) Date of Patent: Mar. 28, 2017

(54) ENVIRONMENT CONTROL SYSTEM

(71) Applicant: PHILIPS LIGHTING HOLDING B.V., Eindhoven (NL)

(72) Inventors: Murtaza Bulut, Eindhoven (NL); Raymond Van Ee, Geldrop (NL); Maria Estrella Mena Benito, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/780,198

(22) PCT Filed: Mar. 12, 2014

(86) PCT No.: PCT/IB2014/059655
§ 371 (c)(1),
(2) Date: Sep. 25, 2015

(87) PCT Pub. No.: WO2014/155222
PCT Pub. Date: Oct. 2, 2014

(65) Prior Publication Data
US 2016/0050738 A1 Feb. 18, 2016

Related U.S. Application Data

(60) Provisional application No. 61/805,190, filed on Mar. 26, 2013.

(51) Int. Cl.
*H05B 37/02* (2006.01)
(52) U.S. Cl.
CPC ..... *H05B 37/0236* (2013.01); *H05B 37/0209* (2013.01); *H05B 37/029* (2013.01); *H05B 37/0227* (2013.01)

(58) Field of Classification Search
CPC ............ H05B 37/0227; H05B 37/0236; H05B 37/029; H05B 37/0209
(Continued)

(56) References Cited

U.S. PATENT DOCUMENTS 6,072,395 A 6/2000 Vega
2003/0218537 A1 11/2003 Hoch et al.
(Continued)

FOREIGN PATENT DOCUMENTS

CN 102474944 A 5/2012
EP 1204300 A1 5/2002
(Continued)

OTHER PUBLICATIONS van Ee, et al., "Multisensory Congruency as a Mechanism for Attentional Control over Perceptual Selection," The Journal of Neuroscience, Sep. 16, 2009, 29(37), 11641-11649 (9 pages).
(Continued)

*Primary Examiner* — Don Le (57) ABSTRACT

An environment control system (1) for controlling the environment in an area (50), the area (50) comprising a plurality of sub-areas ($50_{a1}$-$50_{c5}$), the environment control system (1) comprising: a sensor unit (20) for generating a sensing signal pertaining to activity in the area (50), the sensor unit (20) comprising an activity type determination unit (22) for determining an activity type for each sub-area ($50_{a1}$-$50_{c5}$) based on the generated sensing signal for the area (50), a sound generating device (30) adapted to generate sound (32) with a varying sound property individually in each sub-area ($50_{a1}$-$50_{c5}$), the varying sound property having a first frequency, a light generating device (40) adapted to generate light (42) with a varying light property in each sub-area ($50_{a1}$-$50_{c5}$), the varying light property having a second frequency, a control unit (10) adapted to control the
(Continued)

sound generating device (30) and the light generating device (40) independently for each sub-area (50ai-50c5), depending on the determined activity type for the corresponding sub-area ($50_{a1}$-$50_{c5}$), wherein the ratio between the first and the second frequency is an integer.

15 Claims, 6 Drawing Sheets

(58) Field of Classification Search
USPC .......................................................... 315/291
See application file for complete search history.

(56) References Cited

U.S. PATENT DOCUMENTS

| | | | |
|---|---|---|---|
| 2011/0188050 A1* | 8/2011 | Innami | A61B 5/0059 356/511 |
| 2011/0221348 A1 | 9/2011 | Kwag et al. | |
| 2013/0127366 A1* | 5/2013 | Hayashi | H05B 37/02 315/250 |
| 2016/0310044 A1* | 10/2016 | Maeno | A61B 5/113 |

FOREIGN PATENT DOCUMENTS

| | | |
|---|---|---|
| EP | 1542187 A1 | 6/2005 |
| GB | 2238405 A | 5/1991 |
| WO | 9932017 A2 | 7/1999 |
| WO | 03098971 A1 | 11/2003 |
| WO | 2009150592 A1 | 12/2009 |
| WO | 2012011008 A1 | 1/2012 |

OTHER PUBLICATIONS

Stires, Lloyd, "Classroom Seating Location, Student Grades, and Attitudes—Environment or Self-Selection?" Environment and Behavior, vol. 12, No. 2, Jun. 1980 241-254 (14 pages).

Levine, Douglas W., et al., "Classroom Ecology: The Effects of Seating Position on Grades and Participation," Personality and Social Psychology Bulletin, vol. 6, No. 3, Sep. 1980 409-412 (4 pages).

Perkins, Katherine K., et al., "The Surprising Impact of Seat Location on Student Performance," The Physics Teacher, 43, 30 (2005) (5 pages).

Rebeta, James L., et al., "Variations in Trait-Anxiety and Achievement Motivation of College Students as a Function of Classroom Seating Position," Journal of Experimental Education, 61(3), 257-267, 1993 (11 pages).

Wulf, Kathleen M., "Relationship of Assigned Classroom Seating Area to Achievement Variables," Educational Research Quarterly, vol. 2, No. 2 1977 56-62 (8 pages).

Hillmann, Richard B., "Differences in Self-Esteem of College Freshmen as a Function of Classroom Seating-Row Preference," The Psychological Record, 1991, 41, 315-320 (6 pages).

* cited by examiner

ENVIRONMENT CONTROL SYSTEM

CROSS-REFERENCE TO PRIOR APPLICATIONS

This application is the U.S. National Phase application under 35 U.S.C. §371 of International Application No. PCT/IB2014/059655, filed on Mar. 12, 2014, which claims the benefit of U.S. Provisional Patent Application No. 61/805,190, filed on Mar. 26, 2013. These applications are hereby incorporated by reference herein.

FIELD OF THE INVENTION

The invention relates to an environment control system and an environment control method.

BACKGROUND OF THE INVENTION

Classroom environment such as furnishing and arrangements of the seats can have considerable positive or negative effects on learning. Teachers and scholars recognize the need of having a school classroom in a manner that facilitates positive interaction and learning.

When discussing students, they can be characterized as two different types, Type 1 students and Type 2 students. Type 1 students may, for example, be eager to participate in classroom discussions, eager to learn, motivated to work hard and interact more often with the teacher. Type 2 students may, for example, be less eager to participate in classroom discussions, less eager to learn, less motivated to work and interact less with the teacher. Seats in a typical classroom are arranged in rows. Type 1 students often prefer to sit in the first rows and Type 2 students often prefers to sit in the back rows.

Presently there is much evidence created by scientists, psychologists, and designers that lighting conditions can play important roles on human mood as well as people's cognitive capabilities and social behavior.

There is a growing pressure from the society to save on education costs by increasing class size and by decreasing special education to students that have special needs. This means that students of different cognitive capabilities, different attitudes towards learning, or different attention span, for example a Type 2 student, will be present in the same environment. This development asks for local fine tuning of environmental stimulation.

Accordingly, there is a need for an improved environment control system.

SUMMARY OF THE INVENTION

In view of the above, an object of the invention is to solve, or at least reduce, the drawback discussed above. Generally, the above object is achieved by the attached independent patent claims.

According to a first aspect of the invention, there is provided an environment control system for controlling the environment in an area comprising a plurality of sub-areas, the environment control apparatus comprising: a sensor unit for generating a sensing signal pertaining to activity in the area, the sensor unit comprising an activity type determination unit for determining an activity type for each sub-area based on the generated sensing signal for the area, a sound generating device adapted to generate sound with a varying sound property individually in each sub-area, the varying sound property having a first frequency, a light generating device adapted to generate light with a varying light property in each sub-area, the varying light property having a second frequency, a control unit adapted to control the sound generating device and the light generating device independently for each sub-area, depending on the determined activity type for the corresponding sub-area, wherein the ratio between the first and the second frequency is an integer.

The present invention is based on the idea of providing a combined sensory stimulus that, based on the use of light and sound, which are processed in different areas of the human brain, establishes a synergetic brain engagement effect. This may be achieved by exposing persons in the area under environmental control according to the present invention to light and sound signals in a rhythmically congruent manner, i.e. with variation having the same frequency or where one of the frequencies are an integer multiple of the other frequency. An advantage of providing such combined stimuli in a rhythmically congruent manner is that participation, attention or learning of the persons in the area is enhanced. A further advantage may be that adaptation to the stimuli is avoided or reduced. Yet another advantage may be that persons in the area recall information previously learned in the area.

Since the sound generating device and the light generating device may be controlled individually per sub-area, localized stimuli or stimulation is possible. This means that when the sensor unit detects a certain activity type for the persons in a sub-area, such as persons showing less participation, interest and/or motivation, the environmental control system may provide sensory stimulus in that particular sub-area.

According to an embodiment of the present invention, the first frequency and the second frequency are substantially phase aligned. Since the brain is capable of integrating small differences in phase, completely phase aligned frequencies are not necessary. Phase differences up to 10% of a period of the frequency may be allowed without reducing the positive effect of the combined sensory stimuli. An advantage of this may be that the requirement of synchronicity of the system is lowered, which in turn may reduce the need of service and synchronization of the system.

According to yet another embodiment of the present invention, the control unit may be adapted to control the sound generating device and/or the light generating device such that the generated sound and/or generated light have a square wave pattern. This may increase the perception of congruency by the human brain. For instance, if the light signal and the sound signal have square wave pattern then the congruency, thus the synergetic brain engagement effect of the system, may be stronger than when the signals have sinus wave pattern. According to another embodiment, the generated sound and/or generated light is a signal with transient characteristics. In general, using signals that have strong transients may increase the perception of congruency by the human brain and thus have stronger synergetic brain engagement effect than when using signals with smoother forms.

According to another embodiment of the present invention, the sensor unit comprises a camera. An advantage of the present embodiment may be that the sensor unit can take photos of or film the persons in the area, and thus use image analysis for determining the activity type of the persons depending on their movement. This may allow the environment control apparatus to adapt the environment to the respective activity type of the persons within the area and, thus, to improve the control of the environment. The determined activity type may pertain to a certain sub-area of the area or to the entire area.

According to an embodiment of the present invention, the sensor unit comprises an array of sound recording devices. An advantage of using such an array may be that the activity type determination unit more easily can determine what sub-area the recorded sound is generated in. This may allow the environment control apparatus to adapt the environment to the respective activity type of the persons within the area and, thus, to improve the control of the environment. The array of sound recording devices may for example comprise a sound recording device per sub-area, each of the devices directed towards the respective sub-area. Each sound recording device may in other embodiments be directed to a plurality of sub-areas. The activity type determination unit may use signal analysis for determining what sub-area the recorded sound is generated in.

According to further embodiments of the present invention, the first and second frequency is within the range of 0.15-0.25 Hz. An advantage of this is that the variations of the generated sound and light may be consciously perceptible but subtle in order not to be disturbing or annoying to persons in the area.

The generated sound may be at least one of pink noise, white noise, sound of sea waves, sound of wind and sound of rain. These are examples of sounds that are not disturbing or annoying to a person in the area. In some embodiments, a sound adaptation or matching with a condition in or outside the area can be used. An example of such an adaptation is to generate a sound of rain sound when it's raining outside. This may be advantageous since if the sound is matched with an already existing sound, a person in the area may not perceive the generated sound as disturbing or annoying. The generated sound characteristics or properties may also be adapted according to a disturbing sound present in the area. This may be advantageous since the generated sound may mask or cancel the disturbing sound.

According to an embodiment of the present invention, the system further comprises a display adapted to display the determined activity type for each sub-area. This may be advantageous for showing an overview of the area and where actively and passively participating persons are located. A teacher may for example use such an overview for targeting passively participating persons with questions and the like.

Moreover, the system may further comprise a memory adapted to store data pertaining to activity type for each sub-area over time. These data may be used to analyze for example a teachers teaching style or to evaluate a certain person's development over time.

According to a second aspect, the present invention provides a method for controlling the environment in an area, the area comprising a plurality of sub-areas, the method comprising the steps of: generating a sensing signal pertaining to activity in the area determining the activity type for each sub-area based on for the sensing signal generating, depending on the determined activity in each sub-area, a sound with a varying sound property independently in the corresponding sub-area, the varying sound property having a first frequency, generating, depending on the determined activity in each sub-area, a light with a varying light property independently in the corresponding sub-area, the varying light property having a second frequency, wherein the ratio between the first and the second frequency is an integer.

The second aspect may generally have the same features and advantages as the first aspect.

It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
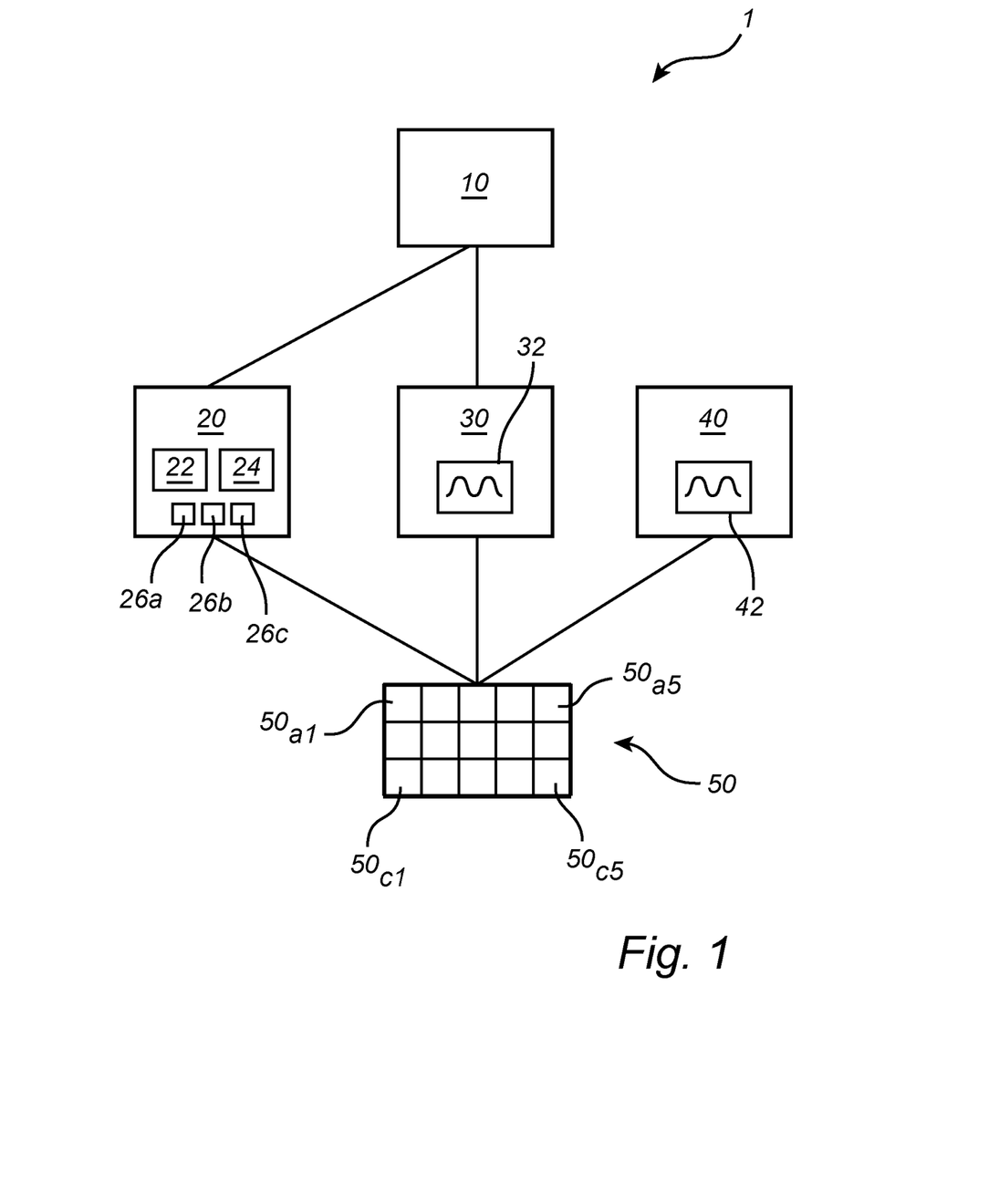
FIG. 1 illustrates an environment control system according to an embodiment of the present invention.

FIG. 1 shows by way of example an environment control system 1 according to an embodiment of the present invention. The system comprises a control unit 10 which controls a sound generating device 30 and a light generating device 40. The sound generating device is adapted to generate a sound 32 for each sub-area $50_{a1}$-$50_{c5}$ of an area 50. The light generating device is adapted to generate a light 42 for each sub-area $50_{a1}$-$50_{c5}$ of an area 50. The division of the area 50 into the sub-areas $50_{a1}$-$50_{c5}$ is just by way of example. The area 50 may for example be divided into more or fewer sub-areas. In some embodiments, the area 50 may just comprise two sub-areas. Each sub-area $50_{a1}$-$50_{c5}$ may comprise none, one or several persons. The activity type of the sub-area $50_{a1}$-$50_{c5}$ is based on the person or persons present in the sub-area. The system 1 further comprises a sensor unit 20. The sensor unit 20 comprises an activity type determination unit 22. The activity type determination unit determines an activity type for each sub-area $50_{a1}$-$50_{c5}$ of an area 50 based on the generated sensing signal from at least one sensor 24, 26a-c. The determined activity type may for example be based on detecting hand raise, posture detection, gaze direction or head position detection, these sensing signals pertaining from a camera 24. In further embodiments, the sensing unit may comprise a plurality of cameras 24. The hand raise detection may for example be executed by several cameras 24, and additional sensors, such as motion sensors, if necessary, to detect when a person, for example a student in a classroom, raises his/her hand and in which sub-area $50_{a1}$-$50_{c5}$ of an area 50 the student is placed. The one or more cameras may further detect the direction the student is looking, based on detecting the head and the direction of gaze, to determine if the student is listening to or bored from the class. The sensor unit 20 may further comprise an array of sound recording devices 26a-c. The array of sound recording devices 26a-c may comprise one or more sound recording devices 26a-c. This may allow the activity type determination unit 22 to do an acoustic scene analysis for determining the activity type of a sub-area $50_{a1}$-$50_{c5}$ of an area 50. The activity type determination unit 22 may for example analyzes sounds collected from different microphones 26a-c and determine the sub-areas $50_{a1}$-$50_{c5}$ of the area 50 where most participation occurs, i.e., based on the location of students that answer teacher's questions or based on students having conversation unrelated to the teacher's questions.

In further embodiments, the sensor unit 20 may comprise sensors for detecting heart rate or breathing rate of the persons in the area 50. Such physiological signals can be used by the activity type determination unit 22 for determining the behavior or mood of a person in the area 50. This information may then be used by the control unit 10 for adapting the environment of the person as described below.

The control unit 10 controls the sound generating device 30 and the light generating device 40 based on the determined activity types received from the sensor unit for a certain sub-area $50_{a1}$-$50_{c5}$. This may be done through localized lighting and localized acoustics. The localized lighting may be achieved by a lighting infrastructure that allows changing the light color and/or intensity locally, i.e., for individual lights and sub-areas $50_{a1}$-$50_{c5}$. The localized acoustics may be achieved by an acoustic system consisting of speakers positioned, for example, in the ceiling in different locations in area 50. In sub-areas $50_{a1}$-$50_{c5}$ wherein the activity type determination unit 22 have determined that the activity type of the persons is such that no extra stimuli is needed, the control unit may of course control the sound generating device 30 and the light generating device 40 such that no sound 32 and light 42 will be aimed at that sub-area $50_{a1}$-$50_{c5}$. If the activity type of the person in that sub-area changes, the control unit may act accordingly. In some embodiments, the extra stimuli, i.e. light and sound, are present during the entire period the same person is present in the sub-area $50_{a1}$-$50_{c5}$. In some embodiments, the minimum period the extra stimuli is present in a sub-area $50_{a1}$-$50_{c5}$ is 5 minutes. Toggling the extra stimuli in a sub-area $50_{a1}$-$50_{c5}$ on and off may be advantageous since the person present in the sub-area $50_{a1}$-$50_{c5}$ may not adapt to the stimuli.

To make the sound signal 32 and light signal 42 more noticeable, and to further enhance the effect of the localized stimuli, the control unit may control the sound generating device 30 and the light generating device 40 such that silence is inserted between variation cycles for the sound signal 32 and/or constant light characteristics is inserted between variation cycles for the light signal 42. An exemplary signal shape if the generated light 42 and/or the generated sound 40 may be: Square wave, square wave, flat, flat, square wave, square wave, flat, flat, etc. These on-off patterns are advantageously time aligned for all sub-area $50_{a1}$-$50_{c5}$.

The effects of classroom seating preferences on academic motivation, participation and performance have been investigated in many studies. The main conclusion is that students sitting in different locations in class are different from each other. The environment control system 1 is based on this conclusion and therefore it is possible adjust the environmental conditions to compensate for these differences. This may be very important for the personal development of students since sitting location, i.e. sub-areas $50_{a1}$-$50_{c5}$, in a classroom, i.e. area 50, can have immediate effects on interest, motivation, and behavior of students. As a result, students sitting on the first rows, i.e. closer to teacher and the board, and students sitting on back rows can develop different characteristics. Respectively, teachers can also develop different attitudes towards these students and perceive them differently. In a long run, these can have significant influences on the development of personality, character, and acquisition of knowledge of the students. The environmental control system 1 may provide sensory stimulus in these particular sub-areas $50_{a1}$-$50_{c5}$ using rhythmically coherent sound and light signals. Different example of these of rhythmically coherent sound and light signals will now be described with reference to FIGS. 2-5.

Figure 2:
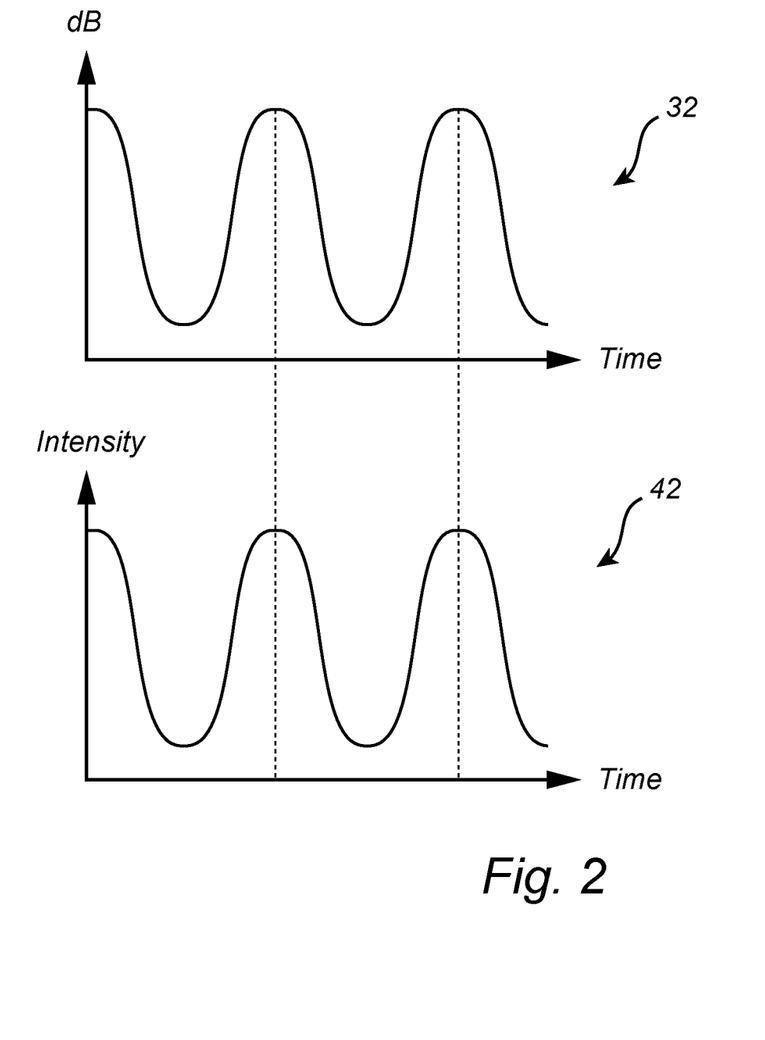
FIG. 2 illustrates an example of rhythmically coherent sound and light signals according to an embodiment of the present invention.

FIG. 2 illustrates by way of example a rhythmically coherent sound and light signals 32, 42. In this embodiment, both the frequency and phase of the both signals are the same. For the sound signal 32, the sound intensity, i.e. the decibel, of the sound signal 32 is varied such that a frequency is formed. The intensity is just an example of a variable light property, in other embodiments other properties, such as a frequency of white noise or the type of sound, may be varied. The average intensity, i.e. decibel, of the sound signal 32 may be between 30 and 50 decibel. This is loud enough to be noticed by the persons in the area, but not loud enough to be distracting. In some embodiments, the average intensity is adaptive and thus based on the sound already present in the area. The intensity variations used for the sound signal 32 may be consciously perceptible but subtle in order not to be disturbing or annoying. The intensity variation may in one embodiment be less than 20 decibel.

According to one exemplary embodiment, all the above mentioned sound properties may be varied, but in different time scales. In one embodiment, the "base value" of the sound properties, values from which the variation starts from, may be changed depending on the subject of the class, start time of the day, season of the year etc. For example, the intensity level of the sound can change from one class to another. In this example, the intensity level is stationary during class time while the frequency of sound is varied during class for example to emphasize of increase the attention at a certain point of time.

In addition to the above described type of sound signal 32, further alternatives are possible. For example, the type of sound signal may be based on a distracting sound that is present in the environment. The distracting sound can be analyzed, and the sound signal 32 can be generated in a manner that masks or cancels the distracting sound. In this way students will be protected from additional distraction. For example, if there are load machines working nearby the area 50, the characteristics of the sound signal 32 can be adjusted so that sound of the machines is partially masked.

The light signal 42 in FIG. 2 has a varying light property varied with the same frequency as the sound signal 32. The varying property of the light signal 42 may be the intensity, or lux, of the light signal 42. In other embodiments, the varying property may be the color temperature of the light. In some embodiments, even the color of the light signal 42 may be varied to some extent.

In some embodiments, the light condition in the area 50, e.g. a class room, will be in range of 300-600 lux luminance levels. When the luminance is 600 lux, one exemplary variation of the luminance level will be in the range of ±50 lux. In general, the variations of light performed by the environmental control system 1 may be performed in a subtle and dynamic manner. The term subtle may be explained with the subjective terms such as "soft and smooth", "gradual", "pleasant and comfortable", "gentle" or "slow". The changes in the lighting may thus be slow, with smooth transitions.

Experiments shows that people are more sensitive to hue changes than to chroma changes. This means that delta of change and speed of change may be greater for chroma than for hue. These settings depend on the environment in which they are presented so they need to be adapted to fit the conditions in the area. People's perception of color change also depends on the color so the variation parameters will be different for each color. For example, people are more sensitive to hue changes in the orange region than those in the blue region. These parameters will vary also for different environments, e.g. classroom size or amount of daylight present.

If the varying light property is the color luminance, the variation should generally be slow, i.e. happening over long periods such as for example 30-60 seconds, or with a small delta. In the case of variations in chroma and hue of the light color, these are less noticeable as mentioned above and the speed of variation and amount of variation may be larger without creating annoying or disturbing effects.

According to one exemplary embodiment, all the above mentioned color properties may be varied, but in different time scales. In one embodiment, the "base value" of the light properties, values from which the variation starts from, may be changed depending on the subject of the class, start time of the day, season of the year etc. For example, the luminance can change from one class to another. In this example, the luminance is stationary during class time while the chroma and hue can be varied, for example to emphasize of increase the attention at a certain point of time. In further embodiments, the chroma base value and the hue base value may change from one class to another.

The variation of the signals 32, 42 may have a cycle time of around 4-6 seconds which translates to a frequency within the range of 0.15-0.25 Hz. The slow cycle time can be advantageous since the variation may not be considered to be disturbing or annoying. This is only an exemplary frequency range, in further embodiments, the cycle time of the signals 32, 42 are faster or slower. In general, a slower cycle time allows for larger variations of the signals 32, 42. The above properties and characteristics of the sound and light signals 32, 42 are equally valid for the exemplary signals shown in FIGS. 3-5.

Figure 3:
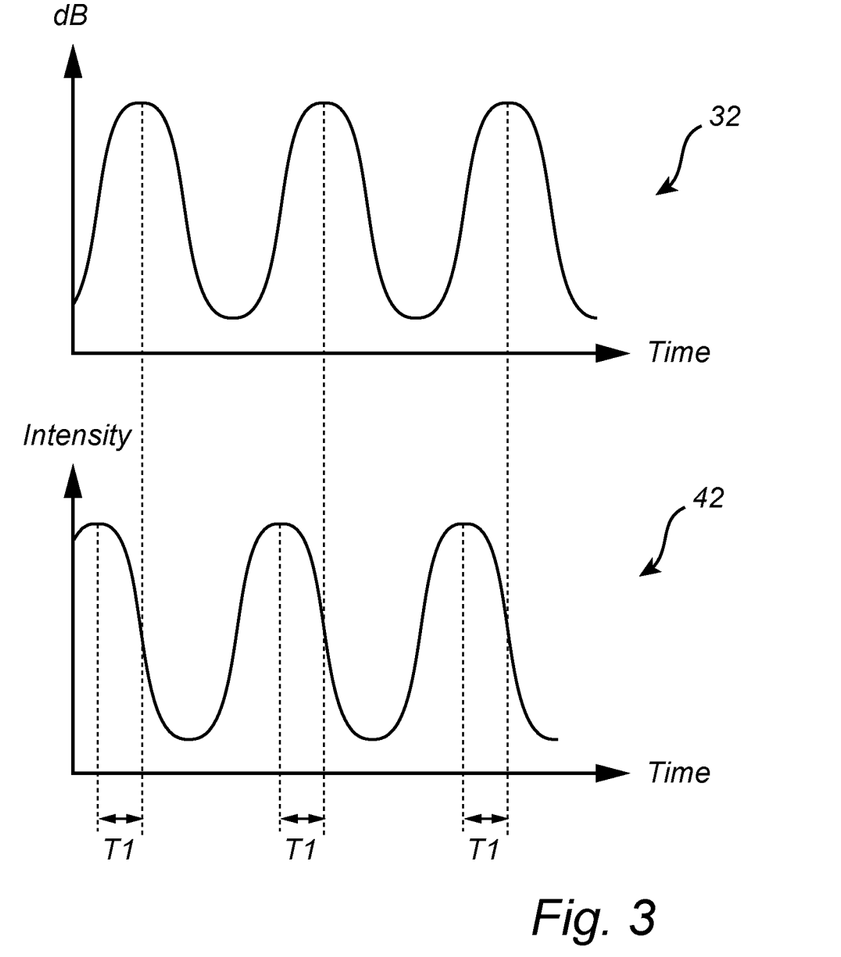
FIG. 3 illustrates an example wherein the light signal has a phase offset compared to the sound signal.

Since the brain is capable of integrating small differences in phase, phase offset between the light signal 42 and the light signal 32 is allowed, as depicted in FIG. 3. For the audio-visual presentations, i.e. sound signal 32 combined with the light signal 42, usually phase differences T1 up to 10% of a period of the frequency may acceptable. This is of course depending on the frequency of the signal. The key is that the perception of the two signals is congruent.

Figure 4:
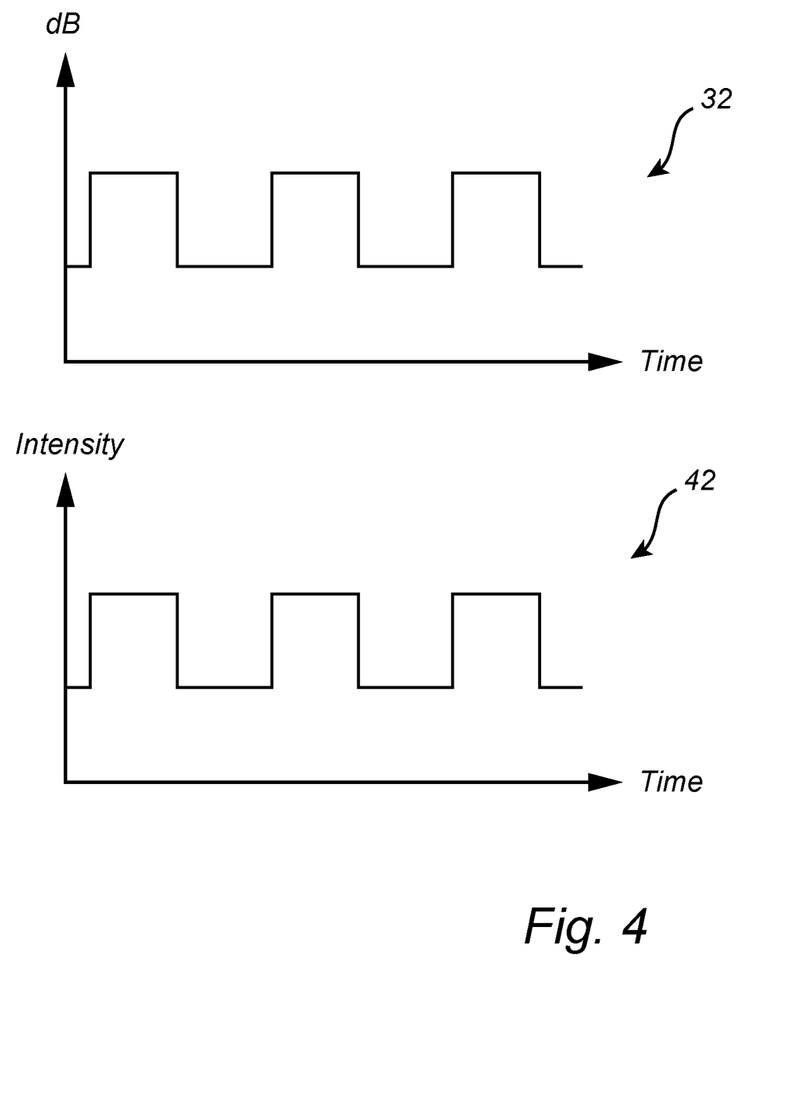
FIG. 4 illustrates an example wherein the sound and light signals have a square wave pattern.
Figure 5:
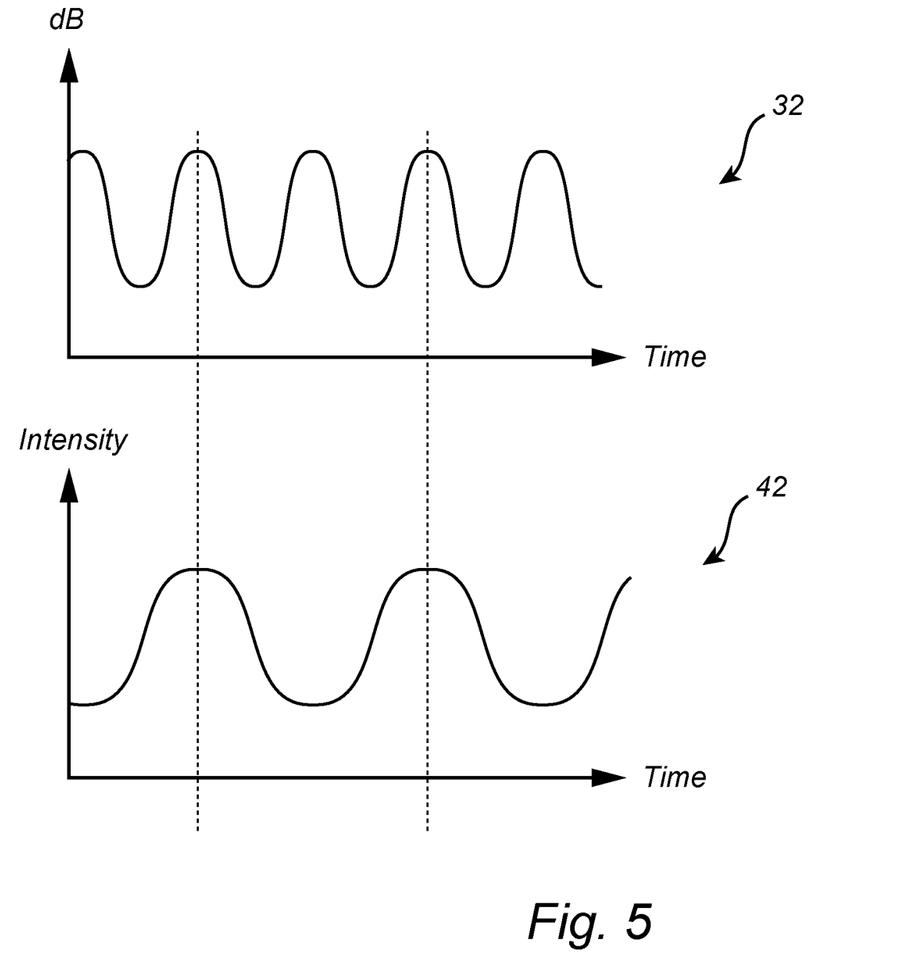
FIG. 5 illustrates an example wherein the frequency of the sound signal is a multiple compared to the frequency of the light signal.

The frequencies shown in FIG. 2-3 have a sine wave pattern. This is just one exemplary wave pattern out of many different possible wave patterns such as square wave pattern, triangle wave pattern and saw tooth wave pattern. FIG. 4 shows by way of example a square wave pattern being employed. In further embodiments, the wave pattern of the light signal 42 may differ from the wave pattern of the sound signal 32. Again, the important characteristic of the frequencies is that the perception of the two signals is congruent, i.e. the two signals having wave crests at substantially the same point in time as described above. This means that the frequency of one of the signals may be a multiple of the frequency of the other signal, as shown in FIG. 5. In FIG. 5, the frequency of the sound signal 32 is twice the frequency of the light signal 42. As indicated by the dashed line, every other wave crest of the sound signal 32 corresponds in time with a wave crest of the light signal 42. The signals 32, 42 in FIG. 5 are phase aligned but a phase offset according to above is possible.

Note that the sound signal 32 and the light signal 42 needs to be chosen such that they have some common characteristics or properties. This means that the selection of light and sound characteristics are not random, but chosen based on each other or based on an already present sound or light in the area. By carefully choosing the light and sound characteristics, the light signal 42 and the sound signal 32 will be perceived as annoying or disturbing by persons being exposed to them but on the contrary will improve the environment for the persons as described above.

Figure 6:
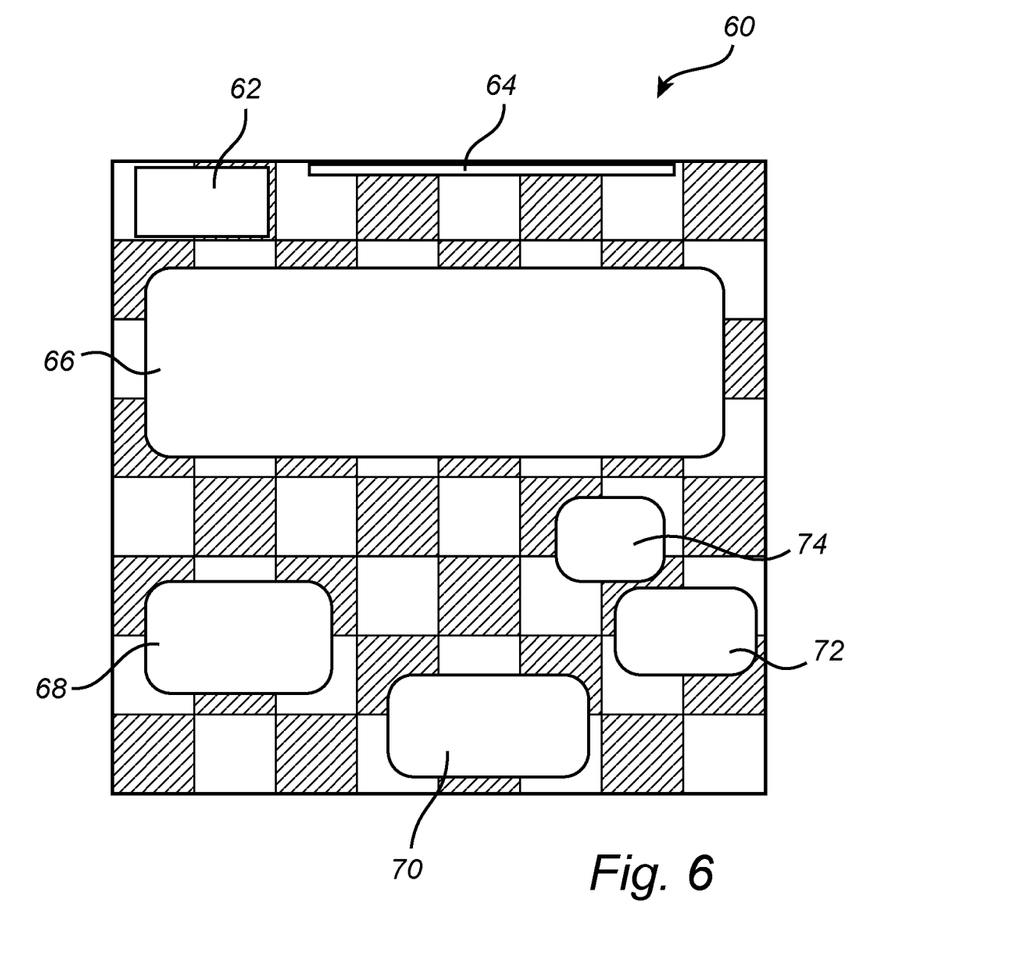
FIG. 6 schematically illustrates a display of student activity types in a classroom according to an embodiment of the invention.

The environment control system 1 may comprise a display adapted to display the determined activity type for each sub-area. FIG. 6 shows by way of example an embodiment of such a display. This display may for example display the determined activity type regarding students in a class room to a teacher. The class room sub-areas are colored or, in any other suitable way, marked based on the determined activity type for that sub-area. The determined activity type may be based on the acoustic scene analysis and/or video analysis combined into a single score. The results of each system can be displayed individually as well, if in depth analysis is desired. In this exemplary embodiment, the display is placed by the teacher's desk 62. The board 64 is marked for reference. Students sitting in the front rows 66 are participating and are engaged with the class according to their determined activity type. Since the environment control system 1 may comprise a memory adapted to store data pertaining to activity type for each sub-area over time evaluation of a certain person's development over time is possible. In FIG. 6, students sitting in the right most sub-area 72 were actively participating in the beginning of a measured period, but have not done so in the last 15 min. The two remaining sub-areas 68, 74 mark students which needs attention. This may be done by changing the environmental conditions for those areas. In its default mode the environmental control system operates in the automatic mode, where the conditions are changed automatically. The system automatically determines which environmental setting needs to be changed and how they need to be changed, and then does the required changes. This has the advantage that a negative situation can be anticipated, or predicted, and the corresponding corrective actions can be taken accordingly. In this example, the control unit 10 of the environment control system 1 may control the sound generating device 30 and the light generating device 40 such that rhythmically coherent sound 32 and light 42 signals are generated in the sub-areas 68, 74 where attentions is needed.

The system may also operate in a manual mode. In this mode, the teacher may change the environmental conditions by pressing the display where improvement is required, for example on the sub-areas 68, 74 where attentions is needed. The display may further be adapted to show what kind of environment parameters, e.g. light and sound, are set in each class room region. The teacher may then select the number of different environment parameters that needs to be changed, for example the teacher can select only light and then only lights will be changed.

The display may have the further effect that it increases the teacher's awareness. Of course a good teacher will be always aware of the active and passive students without a need of such a system. However, even for very good teachers, such a display can be beneficial as it will increase their awareness and help them keep track over time. It will be especially beneficial for classrooms with many students.

The environment control system may in further embodiments be a self learning system. For example, the data indicating performed environmental parameter changes and student's reactions, responses, and progress are stored. Using this data the system is able to learn which changes produce the desired results. It that sense, the system is self learning. This has the advantage that the system can automatically adapt itself according to the different classroom architecture and different cultures, i.e. countries or classes.

The environment control system may further be used for helping students to remember the class content better. Different light and audio settings can be used for different content, for example, for different class subjects such as physics, mathematics, history, etc. In this way, students will learn to associate certain parameters with certain material. Later, when the same environment settings are presented, this may be helpful for students to remember the material faster and better. Environmental parameters may further be continuously changed during the course of the lecture for keeping students attentive and interested in the class. Changing the conditions will be useful in preventing students from getting adapted to the conditions to such a level that conditions are not effective anymore.

The person skilled in the art realizes that the present invention by no means is limited to the preferred embodiments described above. On the contrary, many modifications and variations are possible within the scope of the appended claims. For example, further changeable environmental conditions in the environment control system may include temperature, e.g., decrease temperature in certain sub-areas, air, e.g. activate ventilation in certain sub-areas, and fragrance, e.g., emit a fragrance toward certain sub-areas.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. An environment control system for controlling the environment in an area comprising a plurality of sub-areas, the environment control system comprising:
   a sensor unit for generating a sensing signal pertaining to activity of persons in the area,
   the sensor unit comprising an activity type determination unit for determining an activity type for each sub-area based on the generated sensing signal for the area,
   a sound generating device adapted to generate sound with a varying sound property individually in each sub-area, the variation of the sound property having a first frequency,
   a light generating device adapted to generate light with a varying light property in each sub-area, the variation of the light property having a second frequency,
   a control unit adapted to control the sound generating device to generate sound with a varying sound property and the light generating device to generate light with a varying light property, independently for each sub-area and depending on the determined activity type for the corresponding sub-area,
   wherein the ratio between the first and the second frequency is an integer.

2. A system according to claim 1, wherein the first frequency and the second frequency is substantially phase aligned.

3. A system according to claim 1 wherein the control unit is adapted to control the sound generating device and/or the light generating device such that the generated sound and/or generated light have a square wave pattern.

4. A system according to claim 1, wherein the sensor unit comprises a camera.

5. A system according to claim 1, wherein the sensor unit comprises an array of sound recording devices.

6. A system according to claim 1, wherein the first and second frequency is within the range of 0.15-0.25 Hz.

7. A system according to claim 1, wherein the generated sound is at least one of pink noise, white noise, sound of sea waves, sound of wind and sound of rain.

8. A system according to claim 1, wherein the sound is matched with a condition in or outside the area.

9. A system according to claim 1, wherein the system further comprises a display adapted to display the determined activity type for persons in each sub-area.

10. A system according to claim 1, wherein the system further comprises a memory adapted to store data pertaining to activity type for persons in each sub-area over time.

11. A method for controlling the environment in an area, the area comprising a plurality of sub-areas, the method comprising the steps of:
   generating a sensing signal pertaining to activity of persons in the area,
   determining the activity type for each sub-area based on the sensing signal,
   generating, depending on the determined activity type in each sub-area, a sound with a varying sound property independently in the corresponding sub-area, the variation of the sound property having a first frequency,
   generating, depending on the determined activity type in each sub-area, a light with a varying light property independently in the corresponding sub-area, the variation of the light property having a second frequency,
   wherein the ratio between the first and the second frequency is an integer.

12. A method according to claim 11, wherein the first frequency and the second frequency is substantially phase aligned.

13. A method according to claim 11, wherein the first and second frequency is within the range of 0.15-0.25 Hz.

14. A method according to claim 11, wherein the generated sound is at least one of pink noise, white noise, sound of sea waves, sound of wind and sound of rain.

15. A method according to claim 11, wherein the generated sound is matched with a condition in or outside the area.

* * * * *